Aug. 7, 1928.
J. RHODES ET AL
1,680,174
WATER GAUGE
Filed Jan. 25, 1926
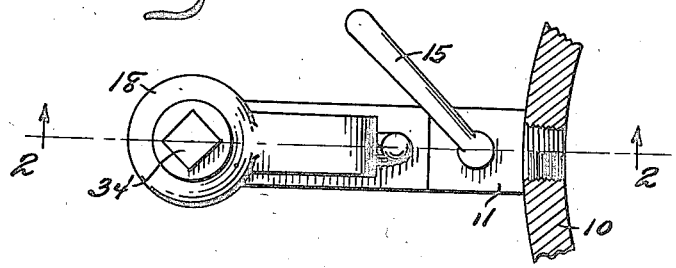
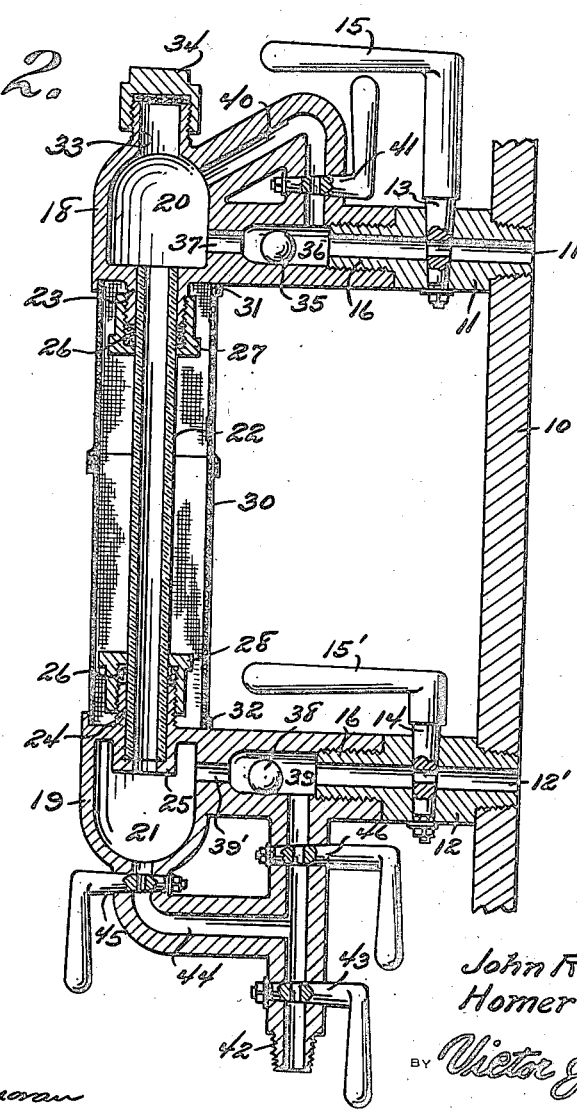
John R Rhodes and
Homer Rhodes
INVENTORS
BY Victor J. Evans
ATTORNEY
WITNESS Patented Aug. 7, 1928.

1,680,174

UNITED STATES PATENT OFFICE.

JOHN RHODES AND HOMER RHODES, OF LEGRAND, IOWA.

WATER GAUGE.

Application filed January 25, 1926. Serial No. 83,737.

The object of this invention is to provide an instrument including special means for controlling the flow to the glass tubular element indicating the water level, these means comprising upper and lower valve mounting devices, main valves and safety valves therein, and additional valves permitting of the passage of fluid around the safety valves, for cleaning purposes, and for relieving pressure, as the case may be.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application,

Figure 1 is a top plan view of the gauge, a portion of the wall of the boiler being shown in horizontal section.

Figure 2 is a vertical section thru the instrument, the section being on line 2—2 of Figure 1.

A portion of the wall of a boiler is designated 10, and threaded into said wall are nuts for connecting devices, angular in cross section and designated 11 and 12. These devices 11 and 12 are provided with bores, such as 11' and 12', and are further provided with tapered bores adapted to receive the main valves shown at 13 and 14 and each provided with a port for registration with the bore of the connecting element 11 or 12 in which it is mounted. The handles for main valves 13 and 14 are designated 15 and 15'.

Each connecting element or nut 11 or 12 is provided with a reduced threaded portion, such as 16 for connection with the adjacent element mounting the valves referred to below. An upper tube mounting element, or bracket, is designated 18, and a lower complementary member is shown at 19, these devices 18 and 19 being provided respectively with chambers 20 and 21 with which the tube 22, or water glass is in communication. This tube 22 passes thru nipples 23 and 24, and the lower end of the tube 22 abuts the bottom portion 25, constituting a retaining device. A packing such as 26 is provided adjacent to the end of each element 23 and 24, and surrounds the glass tube, and nuts 27 and 28 are screwed down on the packing, and surround the glass tube, retaining the latter in position and effecting a water tight connection. A shield 30 of suitable material such as fine wire mesh, surrounds water glass or water tube 22, and is mounted as shown at 31 and 32 in flanged portions of the brackets 18 and 19. The tube 22 is originally inserted thru the neck portion 33 adapted to be closed by a cap 34.

An upper safety ball valve is loosely mounted in a chamber in the upper bracket 18, the valve being designated 35, and the chamber being shown at 36, the latter having communication with chamber 20 thru port 37. Chamber 36 is in communication with the bore 11' of the connecting device or nut 11. A lower safety ball valve is designated 38 and is mounted in chamber 39 having communication thru port 39' with chamber 21 in lower bracket 19.

A by-pass around ball valve 35 is designated 40, and is controlled by a valve 41, this valve permitting of the cleaning of chamber 36, and serving an additional purpose indicated below.

An outlet connection for the instrument is designated 42 and is controlled by valve 43, and a by-pass around ball valve 38 is designated 44 and is controlled by valve 45 and valve 46.

During operation, main valves 13 and 14 and valve 43 are open, the other manually controlled valves being closed. Should the glass tube 22 break or blow out, the ball valves will cut off the steam and water until valves 13 and 14 can readily be closed as an additional precaution.

After inserting a new glass tube 22, thru neck portion 33, the glass should be warmed before the hot water passes thereinto, and this may be done by opening valve 41 controlling by-pass 40. If the water does not pass into tube 22 after a very brief interval, bottom valve 43 is to be closed, and valves 45 and 46 are then opened allowing water to pass around the ball valve for relieving pressure. When conditions are satisfactory, valves 45 and 46 are closed, and valves 13, 14 and 43 are left open.

The lower valve chamber 39 may be cleaned, like the upper valve chamber 36, by opening valve 46, valve 43 also being open. To prevent freezing, at the close of a run, valves 13 and 14 are closed, and valves 43, 45 and 46 are opened. The ball valves are formed of a non-rusting metal or alloy.

Having thus described the invention, what is claimed as new, is:

In a device of the class described, a water level indicating tube, valved means for connecting the upper end of the tube with a boiler, and means for connecting the lower end of the tube with the boiler, said means last named including a bracket having a main bore permitting of the flow of fluid directly between the tube and boiler, an automatically operated valve closing this bore under boiler pressure, if the tube is fractured, this valve being normally influenced uniformly on all portions of its surface by boiler pressure, a manually controlled valve controlling the same bore, and a valve controlled by-pass around the automatically operated valve and communicating directly with the water level indicating tube at a point below the level of the main bore and independently thereof, a discharge connection communicating with the by-pass and with said main bore, a valve in the by-pass adjacent to the main bore, and an additional valve in the discharge connection.

In testimony whereof we affix our signatures.

JOHN RHODES.
HOMER RHODES.